Aug. 13, 1935.  S. DEBUS  2,011,475
BREAD SLICING MACHINE
Filed Oct. 7, 1929  2 Sheets-Sheet 1
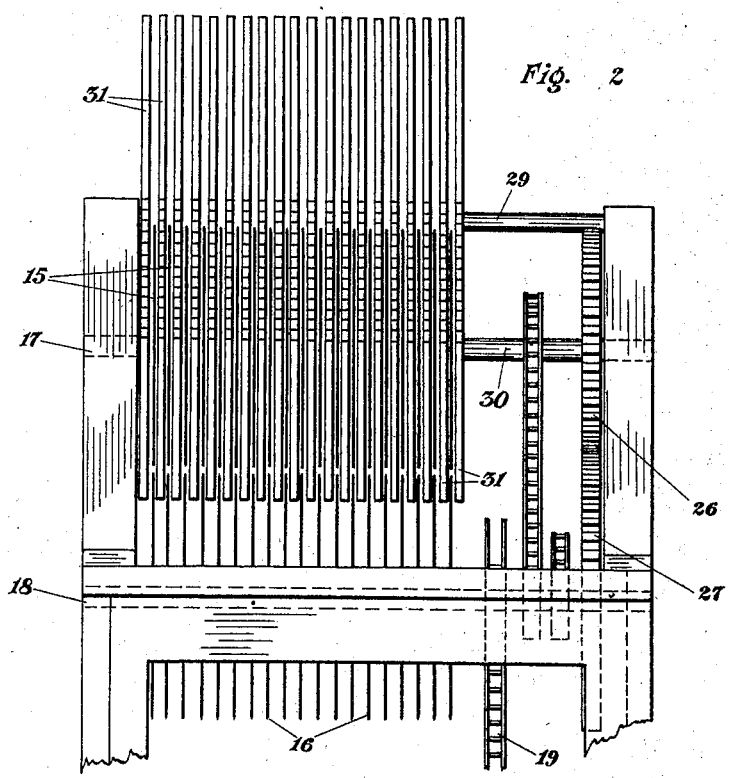
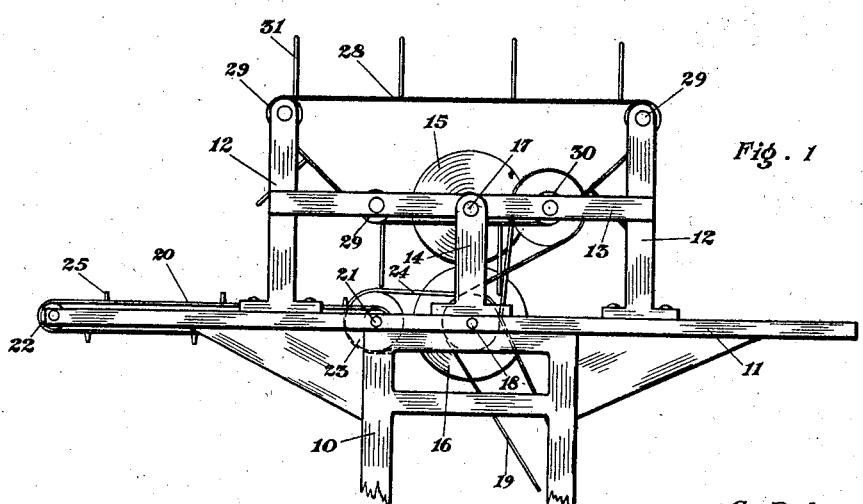
Inventor
S. Debus
By Emil F. Lange
Attorney

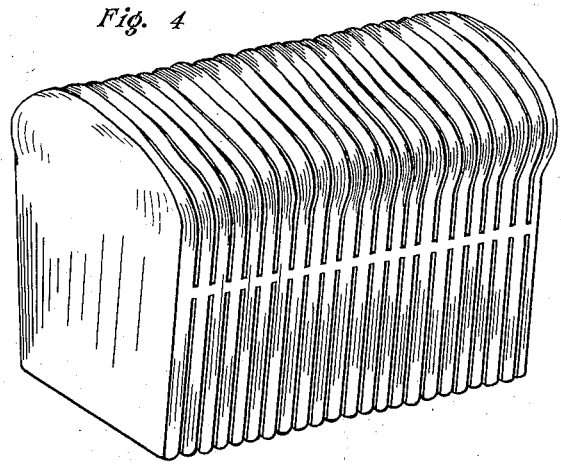
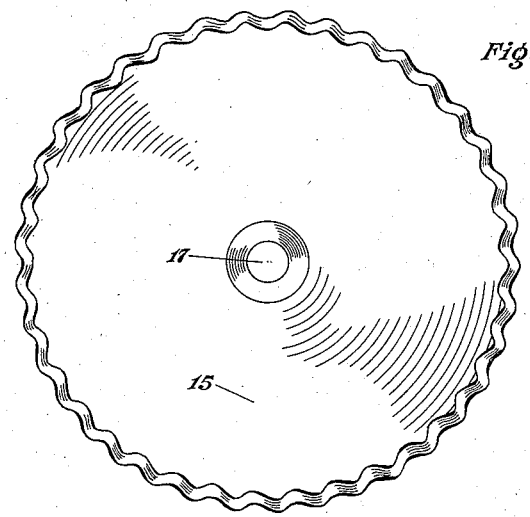

Patented Aug. 13, 1935

2,011,475

UNITED STATES PATENT OFFICE 2,011,475

BREAD SLICING MACHINE

Sander Debus, Hastings, Nebr., assignor to The Micro Corporation, Bettendorf, Iowa, a corporation of Delaware Application October 7, 1929, Serial No. 397,905

5 Claims. (Cl. 146—98)

My invention relates to sliced loaves of bread, to methods of slicing a loaf of bread and to machines for carrying out the method.

The primary object of the invention is the provision of a loaf of bread which is so sliced that the slices adhere to each other until separated immediately before use.

Another of my objects is the provision of a sliced loaf of bread which may pass through the wrapping machine without danger of the accidental separation of the slices from the loaf.

More specifically the object of my invention is the provision of a loaf of bread which is sliced in a manner such that a narrow strip of bread is left uncut so that the loaf will retain its original form and so that the slices may be readily separated from each other.

Another object which I have in view is the provision of a method for slicing a loaf of bread in a manner such that the slices adhere to each other to retain the normal shape of the loaf.

Still another of my objects is the provision of a machine for mechanically slicing the bread loaf in a manner such that the slices will adhere to each other.

Still another of my objects is the provision of a machine which will automatically feed the bread loaves to the slicing device where they are sliced in the manner above indicated, the sliced loaves being delivered from the cutting device which is adapted to be connected with a wrapping device so that the sliced loaves may be fed from the slicing device to the wrapping device.

Having in view these objects and others which will be pointed out in the following description, I will now refer to the drawings, in which Figure 1 is a view in side elevation of my bread slicing machine.

Figure 2 is a view in end elevation and on a somewhat larger scale of the bread slicing machine.

Figure 3 is a face view of one of the rotary slicing knives.

Figure 4 is an illustration showing a loaf of bread after it has passed through the slicing machine.

The machine includes a stand or support 10 to which is secured a platform 11. Four pillars 12 are each secured to the platform 11 and each side pair of pillars is braced by means of the braces 13. The pillars 14 are also secured to the platform 11 and they are secured at their upper ends to the braces 13.

The upper and lower rotary cutters 15 and 16 respectively are secured to shafts 17 and 18 which are journalled respectively in the brace 13 and in the platform 11. Each shaft 17 and 18 carries a plurality of cutters similar to the one shown in Figure 3, the cutters being spaced at such distances from each other as to produce slices of the desired thickness. It is necessary also that the cutters 15 and 16 be arranged in pairs which lie in substantially the same plane. For carrying out my method and for producing a sliced bread loaf of the kind described, it is necessary that the lower edge of the cutter 15 and the upper edge of the cutter 16 be spaced a slight distance from each other as shown in Figures 1 and 2. This distance must be such as to leave a continuous strip of bread between adjacent slices, the strip including portions of the crust at each end of the slice. This strip of bread with the crust end portions must be firm enough to hold the slices of bread together during passage through the wrapping machine and during the normal handling of the bread in a bakery and during transportation. The strip should not be so wide as to make separation difficult or so as to leave an unattractive ridge or groove in the bread slices after it has been separated. The actual width of the strip must necessarily depend largely on the texture of the bread as it is obvious that some of the tougher breads like rye bread may be provided with narrower strips than the more brittle breads. The knives may be so positioned as to reduce the strips to a minimum or to eliminate them entirely.

The machine which I have shown in Figures 1 and 2 also includes means for driving the cutters and for feeding the bread through the cutters. The drive shaft is shown at 18 and this is rotated through the drive connection 19 connected with any suitable source of power. The endless platform 20 passes over the driving roller 21 and over the idler 22 both of which are journalled in the platform 11. The driving roller 21 has secured thereto a pulley 23 which is driven through a belt or other suitable driving connection 24 from a pulley on the shaft 18. The endless platform 20 is provided with projections 25 so that loaves of bread which are deposited on the platform 20 are automatically carried toward the cutters. The cutters 16 are connected directly to the drive shaft 18 but the cutters 15 are driven through spur gears 26 and 27 connecting the shafts 17 and 18. The endless platform 20 carries the loaves toward the cutting knives but this platform alone is not sufficient to carry the loaves through the cutting knives. For this reason I have provided an additional conveyor 28 which cooperates directly with the cutters. The endless conveyor travels over the idlers 29 and over the driving roller 30, the roller 30 being driven by means of driving connections with a pulley on the shaft 18. The endless conveyor 28 is provided with a plurality of arms 31 having a definite relation to the cutters. These arms are so positioned that they pass through between pairs of adjacent cutters as shown in Figure 2. The result is that at the delivery end of the endless platform 20 the loaves are engaged by a plurality of the arms 31 which tend to straighten out the position of the loaves so that they will enter the cutters at right angles to the cutters. These arms 31 also exert pressure on the loaves until the loaves have passed entirely through the cutting mechanism after which they are elevated as shown in Figure 1, leaving the sliced loaf in position for further sliding movement on the platform 11 due to the pressure of the loaves in the rear. The pressure of the arms 31 is exerted against the edge of each slice of the bread.

The knives 15 and 16 are secured firmly to the shafts 17 and 18 respectively. The knives are arranged in pairs, the two knives of each pair lying in a common plane. The knives must be trued to occupy planes which are perpendicular to their shafts. The cutting edges of the knives may have a smooth bevel or they may be serrated in any desirable manner. The cutting edge as shown in Figure 3 is my preferred form of cutting edge, this being the edge best adapted for the cutting of bread.

In Figure 4 I show a loaf of bread as it appears after it has passed through the cutters. The slices are all separated except for a narrow strip of bread which causes the slices to adhere to each other. When the bread leaves the cutter the loaves may be wrapped in the usual manner either manually or mechanically. The adhesion of the slices to each other is sufficient to prevent the accidental separation during wrapping or transportation or other handling. When the bread is received in the home for use it is only necessary to grasp the slices by their edges and to draw them away from the loaf. The bread in the body portion of the loaf is relatively brittle and it separates easily, the tougher portion of the strip being at the crusts. The loaf thus has superior advantages over the loaf which is wholly sliced. A wholly sliced loaf is very difficult to handle in the wrapping machine without the use of accessories which slow down the process and which add to the cost of wrapping. The loaf shown in Figure 4 also has advantages during use. The wholly sliced loaf must be carefully unwrapped in order to avoid the scattering of the slices and the tendency is to throw the separated slices of bread into the bread box where their surfaces dry out rapidly. With my loaf, however, the slices all adhere to each other and they are so close together that the drying out of the slices is negligible. The partly used loaf may readily be wrapped in the wrapper in which the bread came and it may readily be stored in the bread box or in any other suitable place without danger of the bread drying out nor of the slices becoming accidentally separated.

Having thus described my invention in such full, clear, and exact terms that its construction and utility will be readily understood by others skilled in the art to which it pertains, what I claim as new and desire to secure by Letters Patent of the United States is:

1. A bread slicing machine including a cutting mechanism comprising a plurality of uniformly spaced parallel pairs of cutters, the cutters of each pair of cutters being positioned in a common plane and being rotatable in opposite directions, and continuously operating means for pushing loaves of bread through said cutting mechanism, said means including a plurality of arms traveling between each pair of adjacent cutters and adapted to engage the rear ends of the bread loaves, to force the loaves through the cutting mechanism and to discharge the cut loaves from the cutting mechanism.

2. A bread slicing machine including a cutting mechanism comprising a plurality of uniformly spaced parallel pairs of cutters, the cutters of each pair of cutters being positioned in a common plane and being rotatable in unison, and continuously operating means for pushing loaves of bread through said cutting mechanism, said means including a plurality of arms traveling between each pair of adjacent cutters and adapted to engage the rear sides of the bread loaves, to force the loaves through the cutting mechanism and to discharge the cut loaves from the cutting mechanism.

3. A bread slicing machine including a cutting mechanism comprising a plurality of uniformly spaced parallel pairs of cutters, the cutters of each pair being positioned in a common plane and being rotatable in unison, and continuously operating means including a plurality of arms traveling between each pair of adjacent cutters for engaging the loaves of bread as they pass through the cutting mechanism.

4. A bread slicing machine including a cutting mechanism comprising a plurality of uniformly spaced parallel pairs of cutters, the cutters of each pair being positioned in a common plane and being rotatable in unison, each pair of cutters being spaced to leave a narrow uncut portion in the loaf, and continuously operating means including a plurality of arms traveling between each pair of adjacent cutters for engaging the loaves of bread as they pass through the cutting mechanism.

5. A bread slicing machine including a cutting mechanism comprising a plurality of uniformly spaced parallel pairs of cutters, the cutters of each pair being positioned in a common plane and being spaced apart to leave a narrow uncut portion in the loaf, and means for rotating said cutters in unison, and continuously operating means including a plurality of arms traveling between each pair of adjacent cutters and arranged to engage the rear sides of the bread loaves and feed the same through and beyond the cutting mechanism, and means for actuating said arms.

SANDER DEBUS.